United States Patent [19]

Yoshikawa et al.

[11] Patent Number: 5,286,532
[45] Date of Patent: Feb. 15, 1994

[54] METHOD FOR PRODUCING GOLF BALLS

[75] Inventors: Masato Yoshikawa, Kodaira; Yukihiro Kusano, Tokorozawa; Kazuo Naito, Kawasaki; Satiko Okazaki, Tokyo; Masuhiro Kogoma, Wako, all of Japan

[73] Assignees: Bridgestone Corporation; Satiko Okazaki, both of Tokyo; Masuhiro Kogoma, Wako, all of Japan

[21] Appl. No.: 931,972

[22] Filed: Aug. 19, 1992

[30] Foreign Application Priority Data

Aug. 20, 1991 [JP] Japan ................... 3-232181
Jun. 15, 1992 [JP] Japan ................... 4-180291

[51] Int. Cl.$^5$ ................... A63B 37/14
[52] U.S. Cl. ................... 427/536; 427/539; 273/235 B
[58] Field of Search ............ 273/62, 233, 235 R, 273/235 A, 235 B, 217; 427/536, 539

[56] References Cited

U.S. PATENT DOCUMENTS

| | | | |
|---|---|---|---|
| 3,746,858 | 7/1973 | Paulath et al. ............... | 250/325 |
| 4,613,403 | 9/1986 | Oyachi et al. ............... | 156/643 |
| 5,126,164 | 6/1992 | Okazaki et al. ............... | 427/255.6 |

FOREIGN PATENT DOCUMENTS

| | | |
|---|---|---|
| 0346055 | 12/1989 | European Pat. Off. . |
| 59-144465 | 8/1984 | Japan ............... 273/235 A |
| 63-39266 | 8/1988 | Japan . |
| 2-15171 | 1/1990 | Japan . |
| 2-131787 | 5/1990 | Japan ............... 273/62 |
| 3-236475 | 10/1991 | Japan . |
| 3-241739 | 10/1991 | Japan . |
| 2164947 | 4/1986 | United Kingdom ........... 273/235 R |

*Primary Examiner*—Shrive Beck
*Assistant Examiner*—Erma Cameron
*Attorney, Agent, or Firm*—Oblon, Spivak, McClelland, Maier & Neustadt

[57] ABSTRACT

Disclosed herein is a method for producing golf balls which comprises surface-treating a golf ball with atmospheric pressure plasma prior to finish coating. The resulting golf balls have a coating film which is in good adhesion to the golf ball and highly resistant to discoloration and deterioration by heat, moisture, and light. The surface treatment is by the atmospheric pressure plasma which does not need the treating apparatus to be evacuated. The surface treatment under atmospheric pressure requires only a simple treating apparatus and can be applied to any golf balls without evaporating volatile matters contained therein.

12 Claims, 13 Drawing Sheets

METHOD FOR PRODUCING GOLF BALLS

BACKGROUND OF THE INVENTION

1. Field of the Invention

The present invention relates to a method for producing golf balls, and more particularly to a method for producing golf balls having a coating film which is in good adhesion to the golf ball.

2. Description of the Prior Art

Golf balls including thread-wound golf balls and solid golf balls such as one- or two-piece solid golf balls are always provided with a surface coating. The surface coating plays an important role not only in the protection of letters, numerals, and symbols stamped on the golf ball, and of surface gloss and good appearance, but also in the reduction of air resistance which leads to improvement in their flying performance.

The surface coating is usually formed from a polyurethane paint. However, it will peel off upon intense impact by a golf club if it is formed after molding by mere application of a polyurethane paint to the surface of a golf ball. For the improvement of adhesion between a golf ball and a surface coating, several attempts have been made to perform surface treatment on the surface of the golf ball. None of them have achieved satisfactory results and there remain many problems unsolved in the manufacturing process.

There is a known method for surface coating which consists of treating the surface of a golf ball with flame prior to coating. This method is not desirable because it is in danger of fire and burn. Moreover, it does not provide-sufficient film adhesion. There is another known method for surface coating which consists of roughening the surface of a golf ball by sandblasting or the like. This method does not improve the film adhesion as desired, but it seriously damages the dimples formed in the surface.

There is disclosed in Japanese Patent Publication No. 39266/1988 a method for improving film adhesion to golf balls by surface treatment with a low-pressure plasma. A disadvantage of this method is the necessity of a vacuum chamber for plasma treatment which has to be isolated from the atmosphere by a valve, and continuous treatment depends greatly on the life of the valve. Another disadvantage is that the plasma treatment under low-pressure is not useful for golf balls covered with balata resin which gives off volatile ingredients under reduced pressure.

There is disclosed in Japanese Patent Laid-Open Nos. 15171/1990, 48626/19901 241739/1991 and 236475/1991 a method for treating the surface of an object with a glow plasma obtained under atmospheric pressure. This method is suitable for flat objects but is not suitable for spherical objects like golf balls.

SUMMARY OF THE INVENTION

It is an object of the present invention to provide a safe method for producing golf balls having a surface coating layer which is highly resistant to peeling by impact.

To achieve the above-mentioned object, the present inventors carried out a series of researches which led to the finding that if the golf ball is surface-treated with atmospheric pressure plasma prior to coating, the coating film has good adhesion to the golf ball no matter what its raw materials is. Since the surface treatment is performed in a gaseous atmosphere at a comparatively low temperature (80°-100° C.), it can be applied to golf balls made of less heat-resistant materials without deteriorating the golf ball surface or deforming the dimples. In addition, since the surface treatment is performed under atmospheric pressure, it can be applied to golf balls made of balata containing volatile ingredients. The present invention is based on these findings.

The present invention is embodied in a method for producing golf balls which comprises surface-treating an uncoated golf ball with atmospheric pressure plasma, and performing surface coating.

DESCRIPTION OF THE PREFERRED EMBODIMENTS

Figure 1:
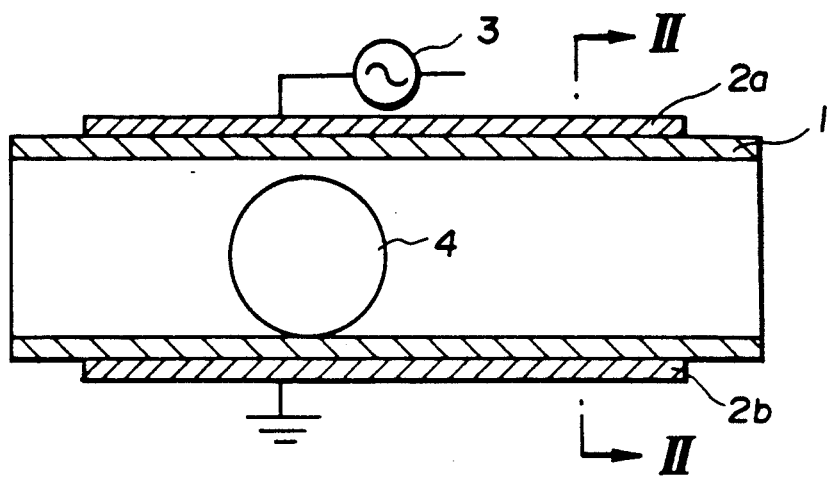
FIG. 1 is a partial longitudinal sectional view showing a surface-treating apparatus used in the present invention.

The invention will be described in more detail in the following.

The first step in the method of the present invention is the surface treatment of a golf ball with atmospheric pressure plasma.

There are no restrictions on the kind of golf balls for surface treatment. They include thread-wound golf balls (consisting of a thread-wound core and a covering layer), one-piece solid golf balls (consisting of a solid core alone), or two-piece solid golf balls (consisting of a solid core and a covering layer). Their surfaces may be made of balata resin, thermoplastic resin, or metal-reinforced peroxide-crosslinked resin, or a blend thereof. No matter what the material is, the surface treatment provides good adhesion between the surface of a golf ball and the coating film formed thereon.

Variations in the method for performing a surface treatment with atmospheric pressure plasma on a golf ball are possible within the scope of the present invention. It can be accomplished by simply placing a golf ball in the atmosphere of atmospheric pressure plasma. Rolling a golf ball is desirable for uniform surface treatment.

More detailedly, the surface treatment may be accomplished by placing a golf ball in an insulating vessel provided with electrodes on its outside or on its outside and inside, introducing a prescribed gas into the insulating vessel, and applying a voltage to the electrodes, thereby generating plasma under atmospheric pressure. It is desirable to roll a golf ball during the surface treatment.

There are no restrictions on the material of the insulating vessel. Typical examples include plastics, glass and ceramics. The insulating vessel is not specifically restricted in its size and shape so long as it is capable of generating a plasma and admitting and rolling a golf ball therein. For uniform surface coating, the insulating vessel should be a cylindrical body large enough to permit a golf ball to pass through. In addition, the insulating vessel should have a wall thickness of 0.001-10 mm, preferably 0.1-5 mm.

The electrodes for voltage application are not specifically restricted in their size and shape so long as they are capable of generating a plasma.

The surface treatment according to the method of the present invention employs a gas which easily permits the atmospheric pressure plasma to take place and hence stably provides the atmospheric pressure plasma. Examples of the gas include inert gases (such as helium, argon, and neon), non-polymerizable gases (such as nitrogen and oxygen), and organic gases, which may be used alone on in combination with one another. Of these gases, helium and neon are preferable. For better adhesion between the golf ball and the coating film, it is possible to use nitrogen gas, oxygen gas, a halogen gas or halogen compound (such as chlorine, bromine, hydrogen chloride, hydrogen bromide, carbon tetrafluoride, bromine cyanide, and tin bromide), sulfur, sulfur trioxide, hydrogen sulfideil ammonia, carbon monoxide, carbon dioxide, and hydrogen. These gases should preferably be diluted with the above-mentioned gas which permits the atmospheric pressure plasma to take place easily.

It is not necessarily essential that these gases be gaseous at normal temperature. They should be fed in a proper way which is selected according to their state (solid, liquid, or gas) at normal temperature and the temperature in the discharge region. Those which are gaseous at normal temperature or at a temperature in the discharge region may be introduced as such into the insulating vessel. Those which are liquid having a comparatively high vapor pressure may be introduced in the form of vapor or after bubbling with an inert gas. Those which are liquid having a comparatively low vapor pressure may be introduced after heating for evaporation or increasing the vapor pressure.

The pressure for generating a plasma is preferably in the range of about 200 Torr to about 3 atm, more desirably about 1 atm.

In the present invention, there are not restrictions on the method of forming a plasma in the insulating vessel. Either direct current and alternating current may be used for voltage application, with the latter being industrially desirable. The frequency should be higher than hundreds of hertz as in the ordinary AC discharge.

The above method can generate an atmospheric pressure glow plasma which gives the best effect on surface treatment of a golf ball. However, in the present invention, an atmospheric pressure plasma may be generated by the other discharge methods including corona discharge, filament discharge and the like.

The above-mentioned treatment of a golf ball in an atmospheric pressure plasma atmosphere may be accomplished by using any of the apparatuses shown in FIGS. 1–25.

Figure 2:
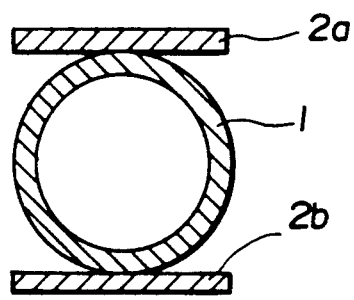
FIG. 2 is a sectional view taken along the line I—II in FIG. 1.
Figure 3:
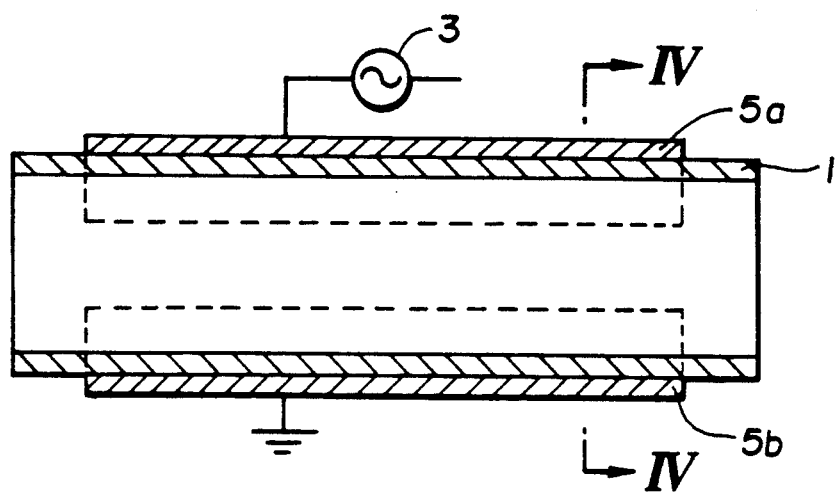
FIG. 3 is a partial longitudinal sectional view showing another surface-treating apparatus used in the present invention.
Figure 4:
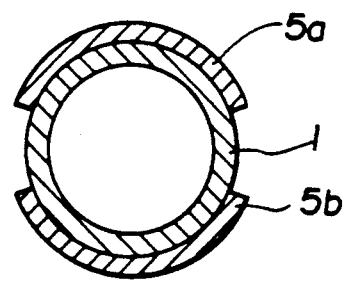
FIG. 4 is a sectional view taken along the line IV—IV in FIG. 3.
Figure 5:
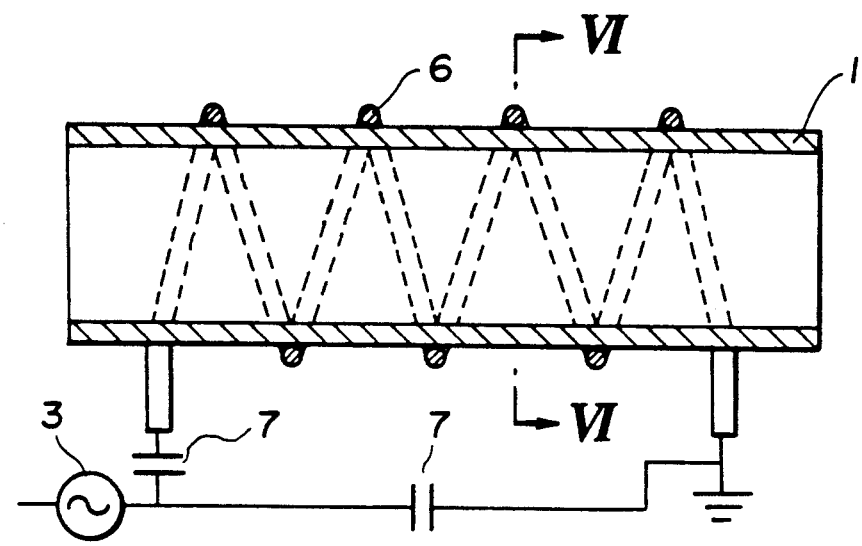
FIG. 5 is a partial longitudinal sectional view showing another surface-treating apparatus used in the present invention.
Figure 6:
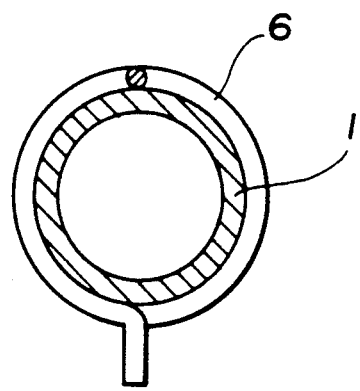
FIG. 6 is a sectional view taken along the line VI—VI in FIG. 5.
Figure 7:
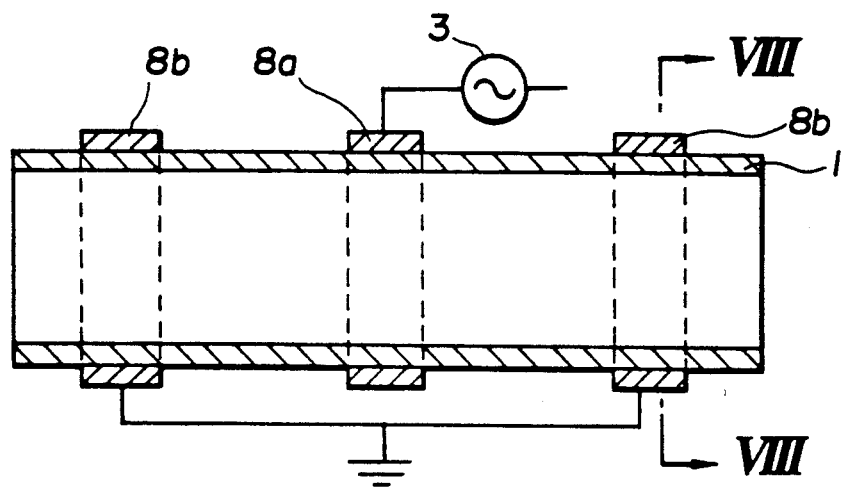
FIG. 7 is a partial longitudinal sectional view showing another surface-treating apparatus used in the present invention.
Figure 8:
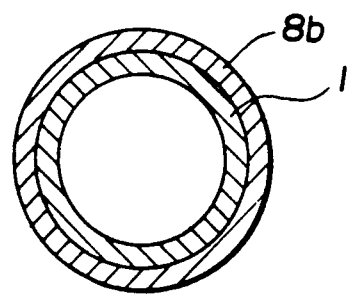
FIG. 8 is a sectional view taken along the line VIII—VIII in FIG. 7.
Figure 9:
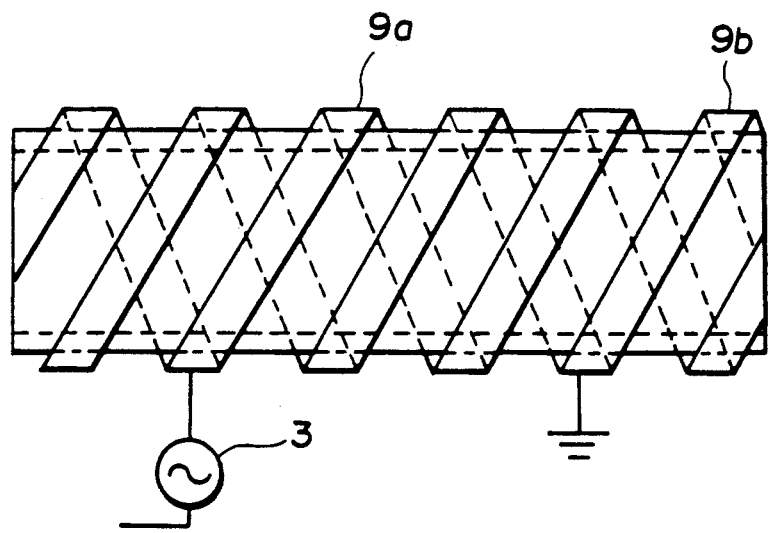
FIG. 9 is a partial longitudinal sectional view showing another surface-treating apparatus used in the present invention.

The apparatuses shown in FIGS. 1–8 have electrodes arranged outside the cylindrical insulating vessel 1. In FIGS. 1 and 2, there are shown an insulating vessel 1, parallel flat electrodes 2a (for voltage application) and 2b (for grounding) across which a voltage is applied by an AC power source 3, and a golf ball 4 which is undergoing the surface treatment with a plasma. In FIGS. 3 and 4, there are shown an insulating vessel 1 and arched electrodes 5a and 5b opposite to each other. In FIGS. 5 and 6, there are shown an insulating vessel 1 and an elongate electrode 6 spirally wound around the insulating vessel 1. A voltage is applied to one end of the electrode through a capacitor 7, with the other end grounded. In FIGS. 7 and 8, there are shown an insulating vessel 1 and annular electrodes 8a (for voltage application) and 8b (for grounding) which are arranged alternately at certain intervals. In FIG. 9, there are shown elongate electrodes 9a (for voltage application) and 9b (for grounding) which are spirally wound around the insulating vessel at certain intervals.

Those apparatuses shown above permit a golf ball 4 to roll in the insulating vessel 1. If the inside diameter of the insulating vessel 1 is close to the outside diameter of the golf ball 4, they permit golf balls to roll smoothly without jams and minimize the diffusion of the treating gas (such as helium) into the atmosphere.

Those apparatuses shown in FIGS. 1-9 designed such that discharge for plasma takes place across the electrode (for voltage application) and the electrode (for grounding), both arranged on the outside of the insulating vessel 1. By contrast, those apparatuses shown in FIGS. 10-18 are designed such that discharge for plasma takes place across the electrodes arranged on the inside and outside of the insulating vessel 1. A voltage may be applied to the inner electrode or outer electrode, with the other electrode grounded or not grounded.

Figure 10:
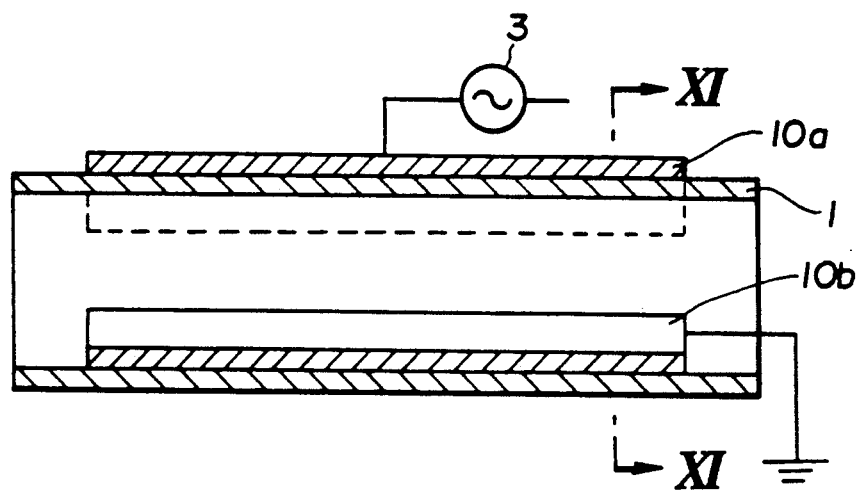
FIG. 10 is a partial longitudinal sectional view showing another surface-treating apparatus used in the present invention.
Figure 11:
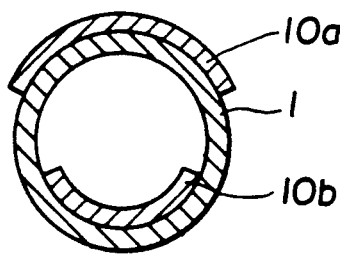
FIG. 11 is a sectional view taken along the line XI—XI in FIG. 10.
Figure 12:
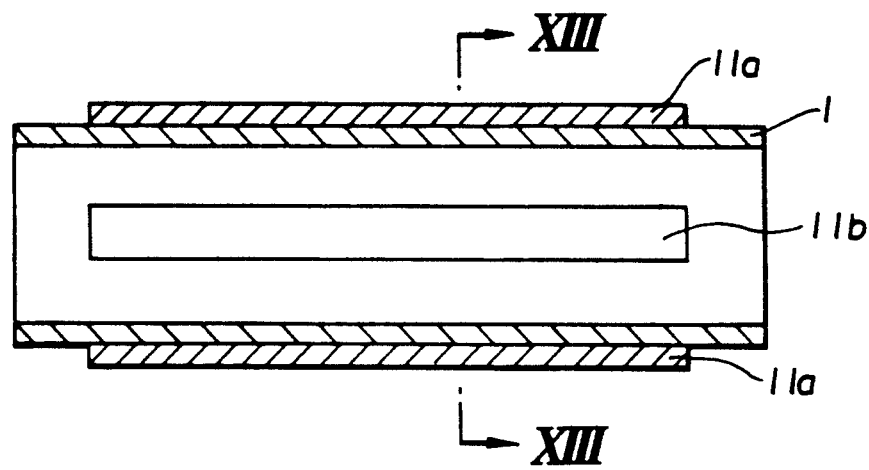
FIG. 12 is a partial longitudinal sectional view showing another surface-treating apparatus used in the present invention.
Figure 13:
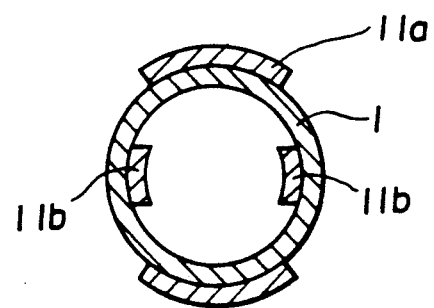
FIG. 13 is a sectional view taken along the line XIII—XIII in FIG. 12.
Figure 14:
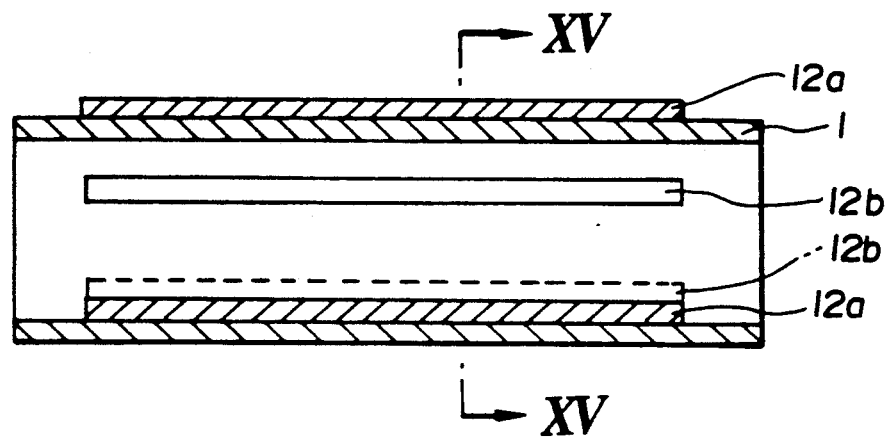
FIG. 14 is a partial longitudinal sectional view showing another surface-treating apparatus used in the present invention.
Figure 15:
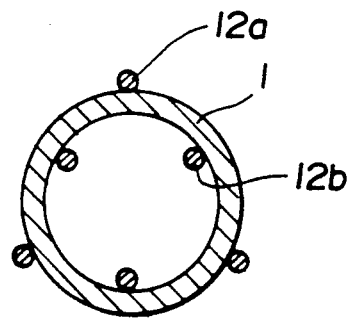
FIG. 15 is a sectional view taken along the line XV—XV in FIG. 14.
Figure 16:
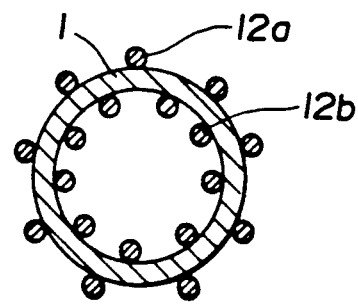
FIG. 16 is a sectional view showing another surface-treating apparatus used in the present invention.
Figure 17:
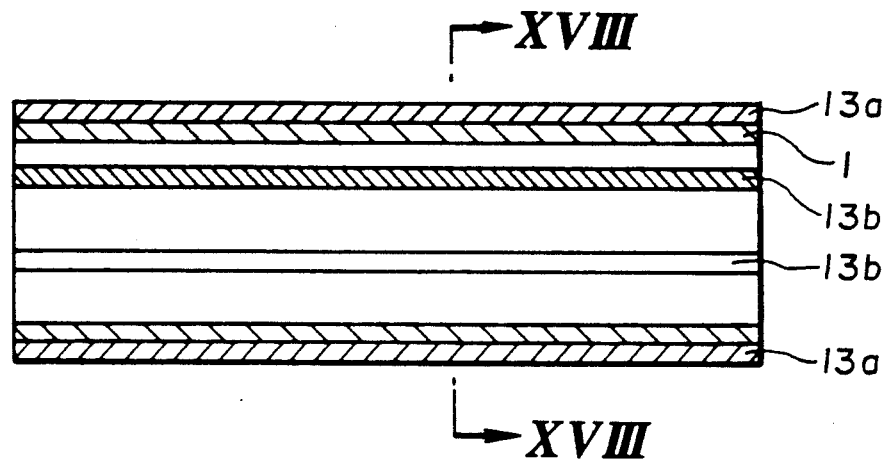
FIG. 17 is a partial longitudinal sectional view showing another surface-treating apparatus used in the present invention.
Figure 18:
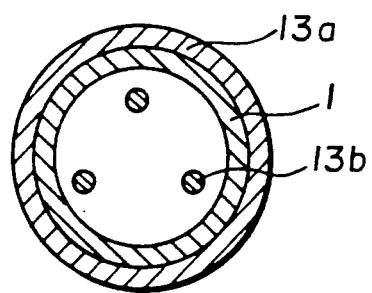
FIG. 18 is a sectional view taken along the line XVIII—XVIII in FIG. 17.

FIGS. 10 and 11 show an apparatus made up of a cylindrical insulating vessel 1 and an arched outer electrode 10a and arched inner electrode 10b which are opposite to each other. A voltage is applied to the outer electrode 10a from the AC power source 3. FIGS. 12 and 13 show an apparatus made up of an insulating vessel 1, two arched outer electrodes 11a and 11a opposite to each other, and two inner arched electrodes 11b and 11b opposite to each other, with the outer and inner electrodes shifted 90° with respect to each other. FIGS. 14 and 15 show an apparatus made up of an insulating vessel 1, elongate outer electrodes 12a arranged at certain intervals,, and elongate inner electrodes 12b arranged at certain intervals. FIG. 16 shows an apparatus of the same type as shown in FIGS. 14 and 15, having nine outer electrodes 12a and nine inner electrodes 12b. FIGS. 17 and 18 show an apparatus made up of an insulating vessel 1, a cylindrical outer electrode 13a surrounding the insulating vessel 1, and three elongate inner electrodes 13b arranged at certain intervals in the insulating vessel 1.

Figure 19:
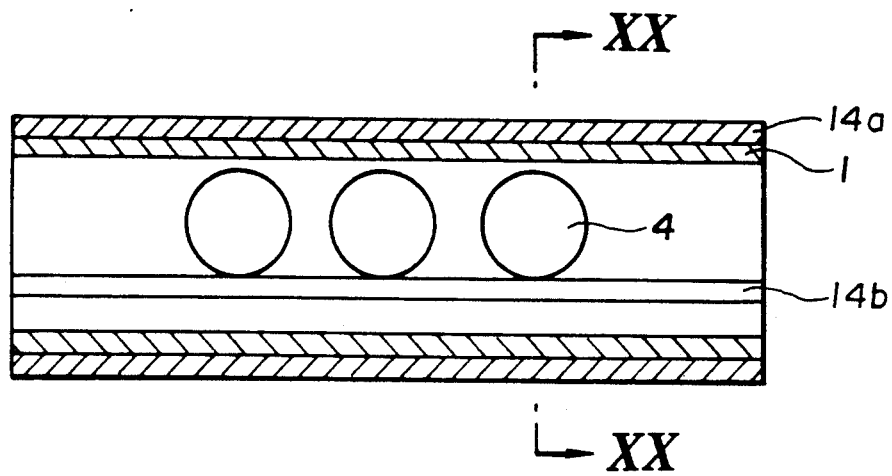
FIG. 19 is a partial longitudinal sectional view showing another surface-treating apparatus used in the present invention.
Figure 20:
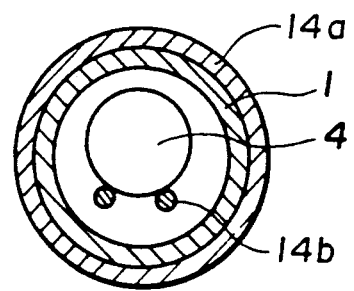
FIG. 20 is a sectional view taken along the line XX—XX in FIG. 19.

FIGS. 19 and 20 show an apparatus designed such that a cylindrical outer electrode 14a covers the insulating vessel 1 and two elongate electrodes 14b and 14b are arranged certain distance apart in the insulating vessel 1. The inner electrodes 14b and 14b function as a guide for the golf ball 4 to roll smoothly without jams. The inner electrodes 14b and 14b should preferably be positioned such that the golf ball 4 placed thereon is as close to the insulating vessel 1 as possible.

Figure 21:
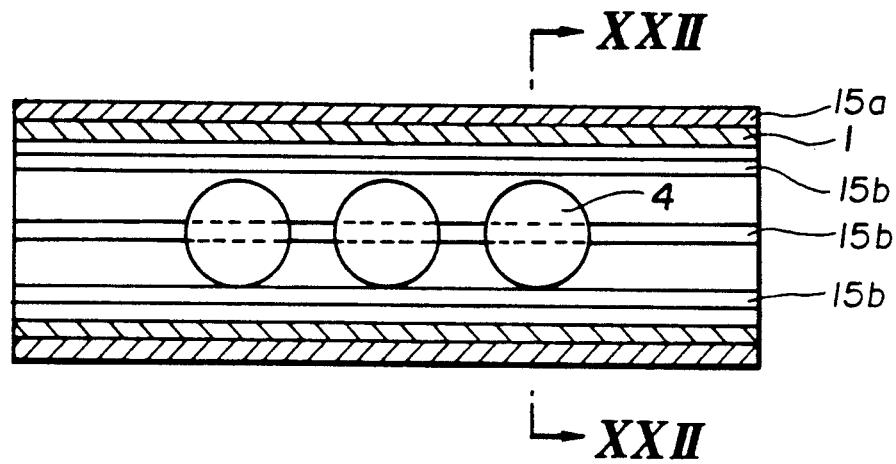
FIG. 21 is a partial longitudinal sectional view showing another surface-treating apparatus used in the present invention.
Figure 22:
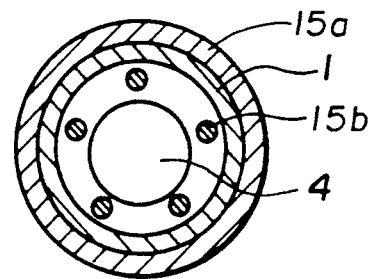
FIG. 22 is a sectional view taken along the line XXII—XXII in FIG. 21.

FIGS. 21 and 22 show an apparatus (similar to that shown in FIGS. 19 and 20) designed such that an outer electrode 15a surrounds the insulating vessel 1 and five elongate inner electrodes 15b are arranged in a circle at certain intervals. A golf ball 4 is placed in the space formed by these inner electrodes 15b.

Figure 23:
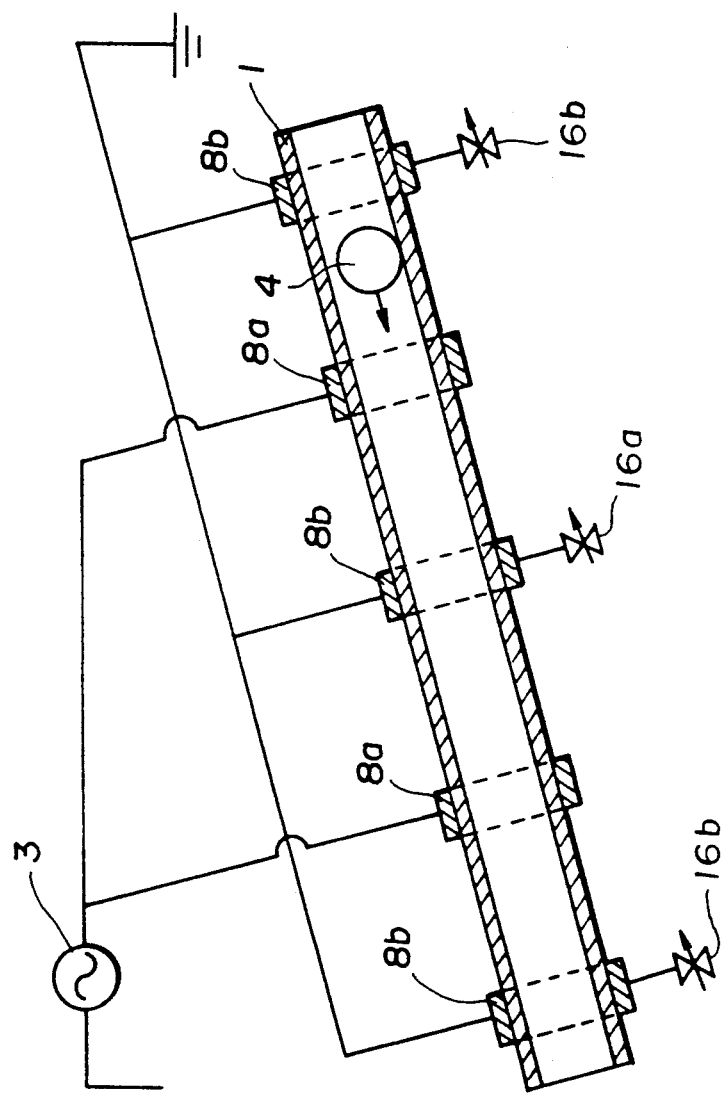
FIG. 23 is a partial longitudinal sectional view showing another surface-treating apparatus used in the present invention.
Figure 24:
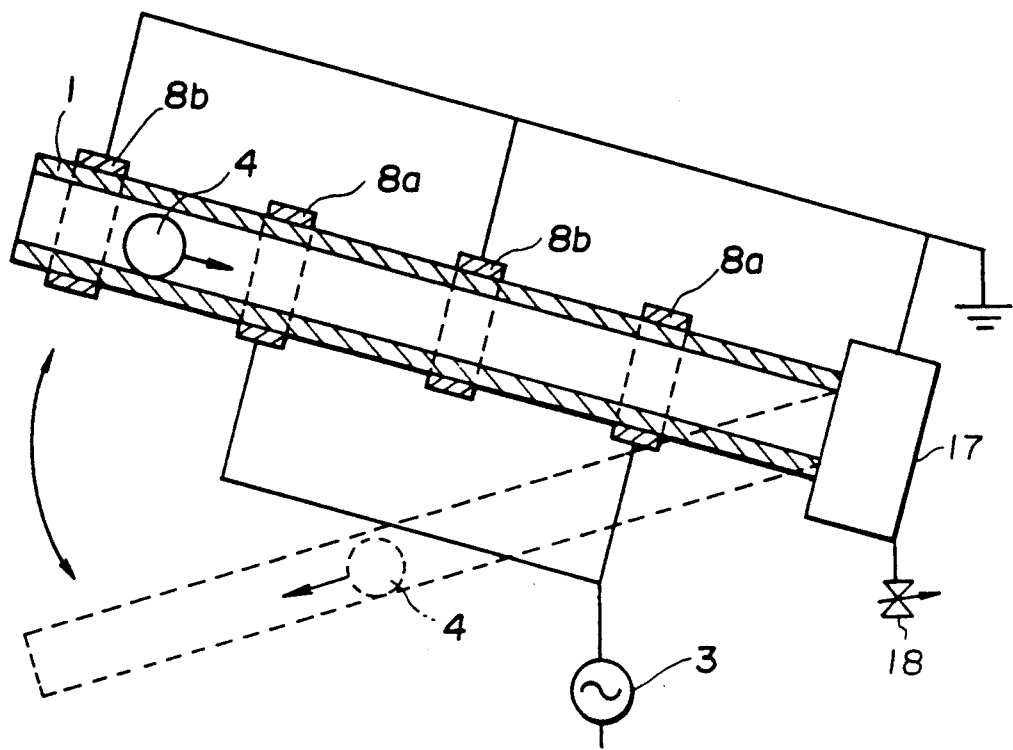
FIG. 24 is a partial longitudinal sectional view showing another surface-treating apparatus used in the present invention.
Figure 25:
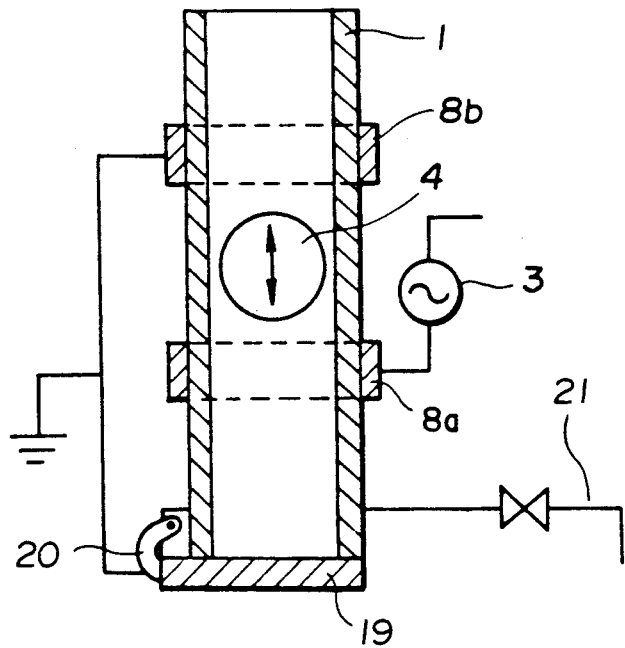
FIG. 25 is a partial longitudinal sectional view showing another surface-treating apparatus used in the present invention.

For continuous surface treatment, it is desirable to use an apparatus as shown in FIGS. 23-25. The apparatus shown in FIG. 23 is provided with the electrodes as shown in FIGS. 7 and 8. When in use, the apparatus permit a golf ball 4 to roll one after another through the insulating vessel held inclined and undergo surface treatment by the atmospheric pressure plasma. The insulating vessel 1 is fed with a prescribed gas through the gas inlet 16a at the center of the insulating vessel 1. There are two auxiliary gas inlets 16a and 16b at the ends of the insulating vessel 1. This arrangement of gas inlets minimizes the diffusion of the gas into the atmosphere.

FIG. 24 shows an apparatus provided with the electrodes as shown in FIGS. 7 and 8. This apparatus is designed such that one end of the insulating vessel 1 is fixed to a swinging mechanism 17 which swings so as to move the other end of the insulating vessel 1 up and down for the charging and discharging of a golf ball 4. While rolling through the insulating vessel, the golf ball 4 undergoes surface treatment. The treating gas is introduced into the insulating vessel 1 through a gas inlet 18 attached to the swinging mechanism 17. This arrangement minimizes the diffusion of the treating gas into the atmosphere.

Furthermore, FIG. 25 shows an apparatus provided with the electrodes (8a, 8b) as shown in FIGS. 7 and 8. This apparatus is designed such that the insulating vessel 1 is held vertical, with the upper end thereof open and the lower end thereof provided with a hinged door 19. The hinged door 19 is opened (via hinge 20) to place a golf ball 4 in the insulating vessel 1. The treating gas is introduced into the insulating vessel 1 via inlet 21 so as to float and roll the golf ball 4 for surface treatment. It is important that the gas between the insulating vessel 1 and the golf ball 4 be properly controlled.

In the embodiments shown in FIGS. 23-25 above, the apparatuses employ the electrodes shown in FIGS. 7 and 8; however, they are illustrative only and it is possible to use other electrodes.

After the surface treatment with the atmospheric pressure plasma mentioned above, the golf ball goes through the coating step. Any golf ball paint may be used for this purpose. A preferred example is a clear or pigmented polyurethane paint. Coating may be accomplished under ordinary conditions. The coating thickness is not limited, although it is preferred to be 0.1 to 100 μm.

EXAMPLE

The invention will be described in more detail with reference to the following examples, which are not intended to restrict the scope of the invention.

EXAMPLE 1

Using an apparatus as shown in FIG. 23, surface treatment was performed on a two-piece solid golf ball (43 mm in diameter) having a covering layer of thermoplastic ionomer resin on which dimples are formed. The glass insulating vessel 1 (1500 mm log and 45 mm in inside diameter) inclined 25° was filled with helium gas introduced through the gas inlet 16a. The insulating vessel 1 was further supplied with helium gas through the gas inlets 16b located at both ends thereof, so that the helium gas leaks slightly from the open ends which serve as the entrance and exit of the golf ball. An AC voltage (4 kV, 5 kHz) was applied across the electrodes 8a and 8b so as to produce an atmospheric pressure glow plasma in the vessel 1. A golf ball 4 was allowed to roll slowly through the vessel 1 from one open end to the other over five minutes during which the surface coating was accomplished.

After surface treatment, the golf ball was coated with 30 μm of a clear polyurethane paint, followed by drying. The adhesion of the coating film was evaluated by cross-hatch test and repeated ball impact test. The results are shown in Table 1.

For comparison, the same procedure as mentioned above was repeated except that the surface coating was not performed. The results are also shown in Table 1.

The cross-hatch test consists of cutting the coating film into small pieces in mutually perpendicular directions, applying a piece of adhesive cellophane tape over the cut coating film, rapidly pulling off the tape, and counting the number of pieces removed.

The repeated impact test consists of subjecting the finished golf ball to impact repeatedly with a golf club (driver) at a head speed of 45 m/sec and visually examining the coating film for peeling from the golf ball.

TABLE 1

|  | Treated ball (Example) | Untreated ball (Comparative Example) |
|---|---|---|
| Cross-hatch test | None peeled out of 10. | 9 pieces peeled out of 10. |
| Repeated impact test | No peeling after 100 repetitions. | Peeling after 20 repetitions. |

EXAMPLE 2

The same procedure as in Example 1 was repeated except that the electrode was replaced by the one shown in FIGS. 5 and 6 and a high-frequency voltage (13.56 MHz, 100 W) was applied across the electrodes. The results were identical with those shown in Table 1.

EXAMPLE 3

Using an apparatus shown in FIG. 24, the surface treatment and coating of golf balls were carried out under the same conditions as in Example 1. The vessel 1 was swung 6 times per minute, with the maximum slope being 30°. The results were identical with those shown in Table 1.

EXAMPLE 4

Using an apparatus shown in FIG. 25, the surface treatment and coating of golf balls were carried out under the same conditions as in Example 1. Helium gas was introduced into the vessel 1 through the inlet 21 so that the golf ball 4 floated in the vessel 1. The results were identical with those shown in Table 1.

EXAMPLE 5

Using an apparatus shown in FIGS. 19 and 20, the surface treatment and coating of golf balls were carried out under the same conditions as in Example 1. The vessel 1 was inclined as shown in FIG. 23. The results were identical with those shown in Table 1.

EXAMPLE 6

Using an apparatus shown in FIGS. 21 and 22, the surface treatment and coating of golf balls were carried out under the same conditions as in Example 1. The vessel I was inclined as shown in FIG. 23. The results were identical with those shown in Table 1.

As mentioned above, according to the method of the present invention, it is possible to produce golf balls having a coating film which is in good adhesion to the golf ball and highly resistant to discoloration and deterioration by heat, moisture, and light. The surface treatment of the golf ball is by the atmospheric pressure plasma which does not need the treating apparatus to be evacuated. The surface treatment under atmospheric pressure requires only a simply treating apparatus and can be applied to any golf balls without evaporating volatile matters contained therein.

What is claimed is:

1. A method for producing a golf ball which comprises surface treating a golf ball with an atmospheric pressure plasma prior to finish coating, the method further including conducting the surface treatment in an insulating vessel having at least three elongate outer electrodes arranged in general at equal intervals and at least three elongate inner electrodes arranged in general at equal intervals.

2. A method for producing a golf ball which comprises surface treating a golf ball with an atmospheric pressure plasma prior to finish coating, the method further including conducting the surface treatment in an insulating vessel having a cylindrical outer electrode surrounding the insulating vessel and a plurality of elongate inner electrodes arranged in general at equal intervals.

3. The method of claim 2, wherein the elongate inner electrodes are produced such that the golf ball is placed thereon.

4. The method of claim 2, wherein the elongate inner electrodes are arranged in a circle so that the golf ball is placed in the space formed by the inner electrodes.

5. A method for producing a golf ball which comprises surface treating a golf ball with an atmospheric pressure plasma prior to finish coating, the method further including conducting the surface treatment in an insulating vessel having two arched outer electrodes opposite to each other, and two inner arched electrodes opposite each other with the outer and inner electrodes shifted 90° with respect to each other.

6. A method for producing a golf ball which comprises surface treating a golf ball with an atmospheric pressure plasma prior to finish coating, the method further including conducting the surface treatment in an insulating vessel having an arched outer electrode and an arched inner electrode which are opposite to each other.

7. A method for producing a golf ball which comprises surface treating a golf ball with an atmospheric pressure plasma prior to finish coating, the method further including conducting the surface treatment in an insulating vessel having two arched outer electrodes opposite to each other.

8. A method for producing a golf ball which comprises surface treating a golf ball with an atmospheric pressure plasma prior to finish coating, the method further including conducting the surface treatment in an insulating vessel having annular outer electrodes for voltage application and annular outer electrodes for grounding which are arranged alternately at generally equal intervals.

9. A method for producing a golf ball which comprises surface treating a golf ball with an atmospheric pressure plasma prior to finish coating, the method further including conducting the surface treatment in an insulating vessel having elongate outer electrodes for voltage application and elongate outer electrodes for grounding which are spirally wound around the insulating vessel at intervals.

10. The method of any one of claims 1-9, further including the step of rolling a golf ball in the atmosphere of atmospheric pressure plasma during the surface treatment.

11. The method of any one of claim 1-9, wherein the atmospheric pressure plasma is an atmospheric pressure glow plasma.

12. The method of any one of claim 1-9, further including providing said insulating vessel as a cylindrical insulating vessel.

* * * * *